United States Patent
Kanazawa

(10) Patent No.: US 6,581,745 B2
(45) Date of Patent: Jun. 24, 2003

(54) DRIVING FORCE DISTRIBUTING APPARATUS FOR A FOUR-WHEEL DRIVE VEHICLE

(75) Inventor: Kazuo Kanazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/950,691

(22) Filed: Sep. 13, 2001

(65) Prior Publication Data
US 2002/0029950 A1 Mar. 14, 2002

(30) Foreign Application Priority Data
Sep. 14, 2000 (JP) ........................ 2000-280600

(51) Int. Cl.$^7$ .................... F16H 48/20; F16H 48/00; F16D 19/00
(52) U.S. Cl. .................... 192/104 R; 475/249; 180/249
(58) Field of Search .................... 192/104 R, 105 B; 464/30, 35, 36; 475/249; 180/249

(56) References Cited

U.S. PATENT DOCUMENTS

| | | | | |
|---|---|---|---|---|
| 1,922,931 A | * | 8/1933 | Defays et al. | 192/105 B |
| 4,390,089 A | * | 6/1983 | Dalrymple | 192/105 B |
| 4,589,296 A | * | 5/1986 | Sato et al. | 74/411 |
| 5,075,854 A | * | 12/1991 | Imaseki et al. | 701/36 |
| 5,168,953 A | * | 12/1992 | Naito | 180/197 |
| 5,171,294 A | * | 12/1992 | Takano et al. | 475/249 |

FOREIGN PATENT DOCUMENTS

| | | |
|---|---|---|
| JP | 5-133427 | 5/1993 |
| JP | 10-44802 | 2/1998 |
| JP | 2970913 | 8/1999 |

* cited by examiner

Primary Examiner—Rodney H. Bonck
Assistant Examiner—Eric M Williams
(74) Attorney, Agent, or Firm—McGinn & Gibb, PLLC

(57) ABSTRACT

In a pressure type differential limiting clutch, a drive plate and a driven plate provided between a clutch drum for transmitting a driving force to a front drive shaft and a clutch hub for transmitting the driving force to a rear drive shaft are pressed by a pressure force of a cone disk spring provided in a pressure plate, and an initial torque by the cone disk spring acts as the differential limiting torque. At a high speed, a weight in limiter device is moved in a radius direction by a centrifugal force through rotation of the rear drive shaft, enters between cam surfaces formed on the pressure plate and the clutch hub, and pushes and broadens. As a result, the pressure plate 65 moves back against energizing force of the cone disk spring, and the initial torque is cancelled.

20 Claims, 3 Drawing Sheets

DRIVING FORCE DISTRIBUTING APPARATUS FOR A FOUR-WHEEL DRIVE VEHICLE

BACKGROUND OF THE INVENTION

The present invention relates to a driving force distributing apparatus for a four-wheel drive vehicle that is capable of automatically canceling an initial torque given by a pressure type differential limiting clutch at a predetermined running speed.

Since a four-wheel drive vehicle is excellent in rough road running property, and also in acceleration property and running stability on ordinary roads, it has rapidly become popular. Direct connection between front and rear wheels can realize a good driving system of the four-wheel drive vehicle. However, in such a state, while there is a merit that a strong four-wheel driving state can be attained, there is a disadvantage that the turning performance becomes poor. Namely, a difference in rotational speed generated between the front and rear wheels at the time of a turning can not be absorbed, and so-called tight corner braking phenomena occur.

Accordingly, in the four-wheel drive vehicle put to practical use, a suitable driving force distribution device is provided between front and rear wheel transmission shafts. Namely, the front and rear wheels are coupled through the driving force distribution device in the state where a predetermined differential rotation is allowed.

As the driving force distribution device, a center differential, a torque coupling, or the like is often adopted. A viscous coupling or a multiple disk clutch is used as the torque coupling. Further, as the torque coupling, there is a torque coupling of a so-called hydraulic type. In the torque coupling of the hydraulic type, a hydraulic pump is provided in a casing that is interlocked and rotated with a transmission shaft connected to one of front and rear wheels, and a rotor that is accommodated in the casing and is interlocked and rotated with a transmission shaft to the other.

However, when the driving force distribution device is provided between the front and rear wheel drive shafts, a slip becomes apt to occur at one of the front and rear wheels at the time of running on a rough road such as a low $\mu$ road (in other words, a road having low friction coefficient). Accordingly, the traction control becomes difficult as compared with a direct coupling four-wheel drive vehicle at that time.

Thus, in many cases, the driving force distribution device is preferable to provide with a differential limiting device. In the differential limiting device, an initial torque at such a level that the tight corner breaking phenomenon can be allowed is added between the front and rear wheel transmission shafts.

For example, in Japanese Patent Unexamined Publication No. Hei. 10-44802, a multiple disk clutch is adopted as a differential limiting device. An initial torque is generated by a hydraulic pressure, a load of a coned disk spring for pressing the multiple disk clutch, to thereby obtain a differential limiting torque at the time of start.

It is preferable to give a differential limiting torque to front and rear transmission shafts to improve vehicular starting performance. On the other hand, in the conventional structure in which the initial torque is generated by the multiple-disk clutch using friction engagement elements and the coned-disk spring that applies a load to the friction engagement elements, the initial torque is always generated between the front and rear transmission shafts, even in a region where vehicle speed is high and the initial torque is not needed. This is a problem. Namely, in the case where a differential rotation occurs between the front and rear wheels, the initial torque is generated, so that this initial torque acts as an output loss of a driving system. Accordingly, there are disadvantages that an uncomfortable feeling is given to a driver, and fuel consumption becomes larger.

In order to deal with this, for example, Japanese Patent No. 2970913 discloses a technique for actively controlling the intermittent ON-OFF operation of a multiple disk clutch by using a hydraulic pressure. According to the technique recited in this publication, in a region where the initial torque is not needed, the multiple disk clutch is actively disconnected, so that the differential limiting torque can be cancelled.

However, in the technique disclosed in this publication, a hydraulic pressure source for operating the multiple disk clutch is always needed, and it can not be easily attached (adapted) to a driving force distribution device without the hydraulic pressure source, and there is a problem that flexible controllability is lacking.

SUMMARY OF THE INVENTION

In view of the above, the present invention has an object to provide a driving force distribution device for a four-wheel drive vehicle where a hydraulic pressure source is unnecessary, a differential limiting torque can be actively cancelled, and an uncomfortable feeling is not given to a driver, fuel efficiency is improved, and flexible controllability is excellent.

The above-mentioned object can be attained by a driving force distributing apparatus, according to the present invention, comprising:

a differential device provided in a vehicle for torque distribution;

a differential limiting clutch provided to variably apply a differential limiting torque to limit a differential operation of the differential device;

an initial torque applying mechanism provided to apply an initial torque to the differential limiting clutch; and a torque limiter provided to cancel the initial torque at a predetermined vehicle speed.

In addition, the above-mentioned object can also be achieved by a driving force distributing apparatus for a four-wheel drive vehicle, according to the present invention, comprising:

a center differential device provided distribute a torque from an output shaft of a transmission to a front drive shaft operatively connected to front wheels and a rear drive shaft operatively connected to rear wheels;

a differential limiting clutch provided to variably apply a differential limiting torque to limit a differential operation of the center differential device;

an initial torque applying mechanism provided to apply an initial torque to the differential limiting clutch; and a torque limiter provided to cancel the initial torque at a predetermined vehicle speed.

In the driving force distributing apparatus, it is advantageous that the torque limiter is provided between the front wheel shaft and the rear wheel shaft.

In the driving force distributing apparatus, it is preferable that the torque limiter is provided between the output shaft and the front wheel shaft.

In the driving force distributing apparatus, the torque limiter may be provided between the output shaft and the rear wheel shaft.

Further, the above-mentioned object can also be attained by a driving force distributing apparatus for a four-wheel drive vehicle, according to the present invention, comprising:

a center differential device provided to distribute a torque from an output shaft of a transmission to a front drive shaft operatively connected to front wheels and a rear drive shaft operatively connected to rear wheels;

a differential limiting clutch provided to variably apply a differential limiting torque to limit a differential operation of the center differential device, the differential limiting clutch having a clutch drum operatively connected to one of the output shaft, the front drive shaft and the rear drive shaft, a clutch hub operatively connected to the other one of the output shaft, the front drive shaft and the rear drive shaft, a plurality of plates interposed between the clutch drum and the clutch hub, and a pressure plate operative to press the plates to engage the clutch drum and the clutch hub;

a spring mechanism provided to apply a spring force to the pressure plate to preload the differential limiting, thereby to generate an initial torque; and a torque limiter provided to apply a force opposite to the spring force depending on vehicle speed, to thereby cancel the initial torque at a predetermined vehicle speed.

In the driving force distributing apparatus, the spring mechanism may be a cone disk spring.

In the driving force distributing apparatus, it is advantageous that the torque limiter comprises a plurality of weights interposed in a space having a triangular-cross-section defined between cam surfaces formed on the clutch hub and the pressure plate, respectively, whereby the weights move in a radius direction depending on vehicle speed and push back the pressure plate against the spring force according to the cam surfaces.

Further, in the driving force distributing apparatus, it is more advantageous that the torque limiter further comprises a position plate disposed in the space and having a plurality of pockets formed in a radial direction for supporting movement of corresponding weights.

In the above-mentioned driving force distributing apparatus, necessary driving force is transmitted via the differential limiting clutch by the differential limiting torque generated from the initial torque of the differential limiting clutch. On the other hand, at the time of running, when the vehicle speed exceeds the predetermined vehicle run speed, the torque limiter device with the vehicle speed sensor operated by the centrifugal force thereof is activated, and the torque limiter device disconnects the driving force and cancels the initial torque.

In this embodiment, preferably, the torque limiter includes pressure surfaces formed between the two shafts or the differentials, a position plate provided between the press surfaces, and a weight provided in a slit-like pocket formed radially therein. In addition, the weight is provided between both the pressure surfaces, and at least one of the press surfaces has a taper shape so as toconver the other pressure surface.

DETAILED DESCRIPTION OF THE PREFERRED EMBODIMENTS

Figure 1:
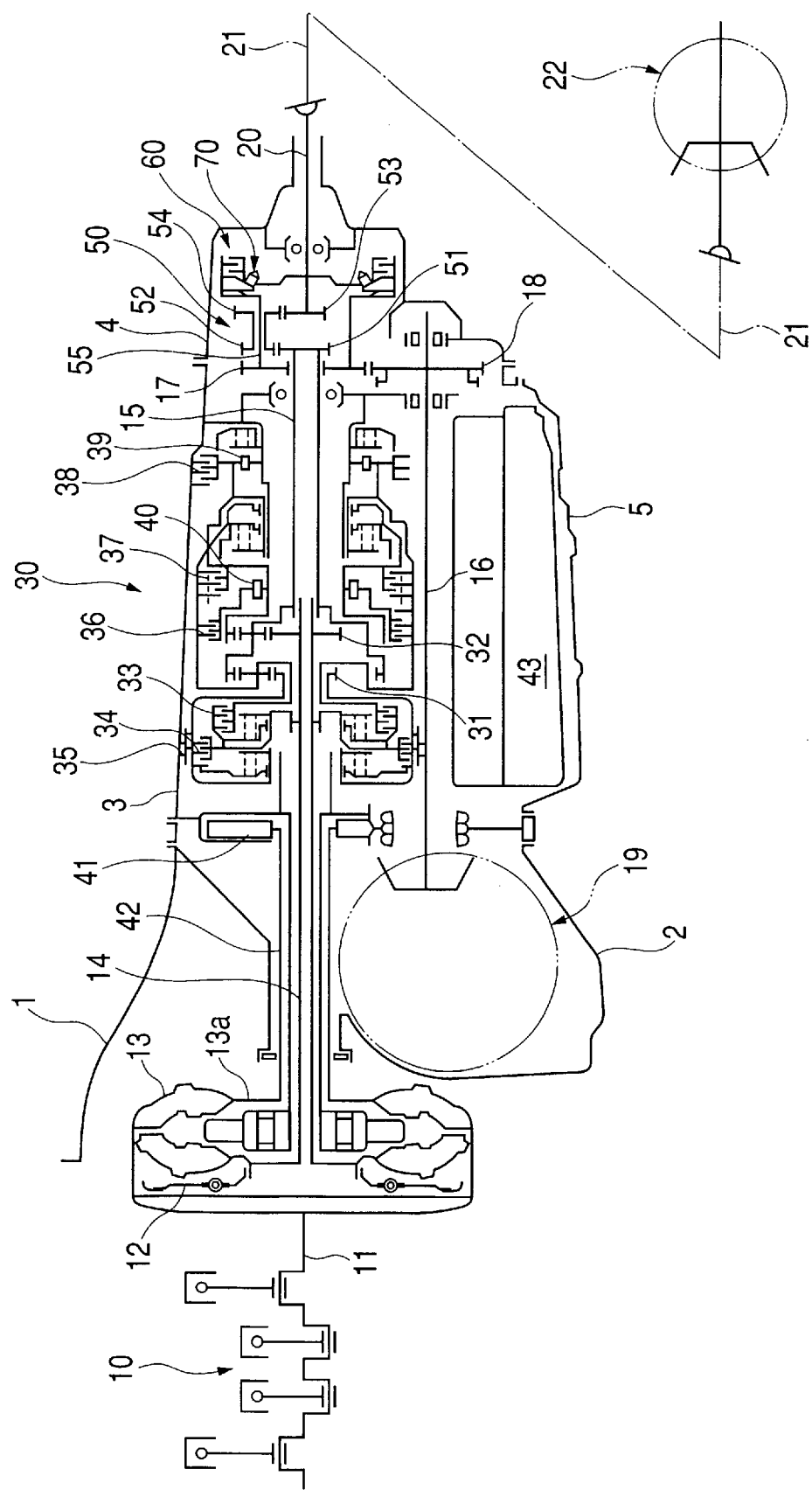
FIG. 1 shows a schematic structural view of a driving force distributing apparatus for a four-wheel drive vehicle.

Hereinafter, an embodiment of the present invention will be described with reference to the drawings. FIG. 1 is a schematic structural view of a driving force distributing apparatus for a four-wheel drive vehicle.

As shown in the drawing, in this embodiment, as a driving system of the four-wheel drive vehicle, a vertical trans-axle type is adopted. In this driving system, provided are a torque converter case 1, a differential case 2, a transmission case 3, an extension case 4 and an oil pan 5. The torque converter case 1 and the differential case 2 are integrally formed at the front. The transmission case 3 is connected to the rear end of the cases 1 and 2. The extension case 4 is connected to the rear side of the transmission case 3. A transmission is provided in the extension case 4. Further, the oil pan 5 is attached to the lower portion of the transmission case 3.

Reference numeral 10 designates an engine. A crank shaft 11 of the engine 10 is coupled to the input side of a torque converter 13. The torque converter 13 is disposed inside of the torque converter case 1 and is provided with a lockup clutch 12. Further, a transmission input shaft 14 of an automatic transmission 30 is disposed in the transmission case 3 that is coupled to the output side of the torque converter 13.

On the other hand, an output shaft (transmission output shaft) 15 of the automatic transmission 30 is disposed coaxially with the input shaft (transmission input shaft) 14, and the transmission output shaft 15 is coupled to the input side of a center differential device 50 as the transmission disposed in the extension case 4. Further, a front drive shaft 16 as a front wheel transmission shaft and a rear drive shaft 20 as a rear wheel transmission shaft are branched-off from and connected to the output side of the center differential device 50.

The front drive shaft 16 is disposed in the transmission case 3 and extended in parallel with the transmission input shaft 14 and the output shaft 15. The rear end of the front drive shaft 16 is coupled to the center differential device 50 through a pair of reduction gears 17 and 18. Further, the front end of the front drive shaft 16 is coupled to a front differential device 19 disposed in the differential case 2. A front wheel output shaft (not shown) connected to front wheels is coupled with the front differential device 19. The rear drive shaft 20 is coupled with a rear wheel output shaft (not shown) for pivotally supporting rear wheels through a propeller shaft 21 and a rear differential device 22.

On the other hand, the automatic transmission 30 includes a front planetary gear 31 and a rear planetary gear 32. With respect to the front planetary gear 31 and the rear planetary gear 32, there are provided a high clutch 33, a reverse clutch 34, a brake band 35, a forward clutch 36, an over running clutch 37, a low and reverse clutch 38, and one-way clutches 39 and 40. Accordingly, four forward speeds and one backward speed gear shift can be obtained by selectively engaging them respectively.

At the front of the automatic transmission 30, an oil pump 41 is provided to couple and to drive an impeller sleeve 13a of the torque converter and a drive shaft 42, and a control valve body 43 is contained in the oil pan 5. By the control valve body 43, oil is supplied to and discharged from the foregoing respective friction elements, and control of engagement and disengagement is individually made.

The center differential device 50 is of a complex planetary gear type. The device 50 comprises a first pinion 52, a first sun gear 51, a second pinion 54, and a second sun gear 53. The first pinion 52 is engaged with a first sun gear 51 provided at the output shaft 15. The second pinion 54 engaged with a second sun gear 53 provided at the rear drive shaft 20. The first and second pinions 52 and 54 are integrally formed. Besides, a carrier 55 for rotatably supporting the pinions 52 and 54 is coupled with the reduction gear 17.

When driving force outputted from the output shaft is transmitted to the first pinion 52 through the first sun gear 51, a torque is transmitted at a predetermined distribution ratio to the second sun gear 53 and the reduction gear 17 through the second pinion 54 integrated with the first pinion 52 and the carrier 55. At this time, a difference in rotational speed between those of the second sun gear 53 and the reduction gear 17 is absorbed by the rotational difference of the first and second pinions 52 and 54. Incidentally, in this embodiment, pitch circle radii of the first and second pinions 52 and 54 are set to have larger torque of reference torque distribution to the rear wheel.

Figure 2:
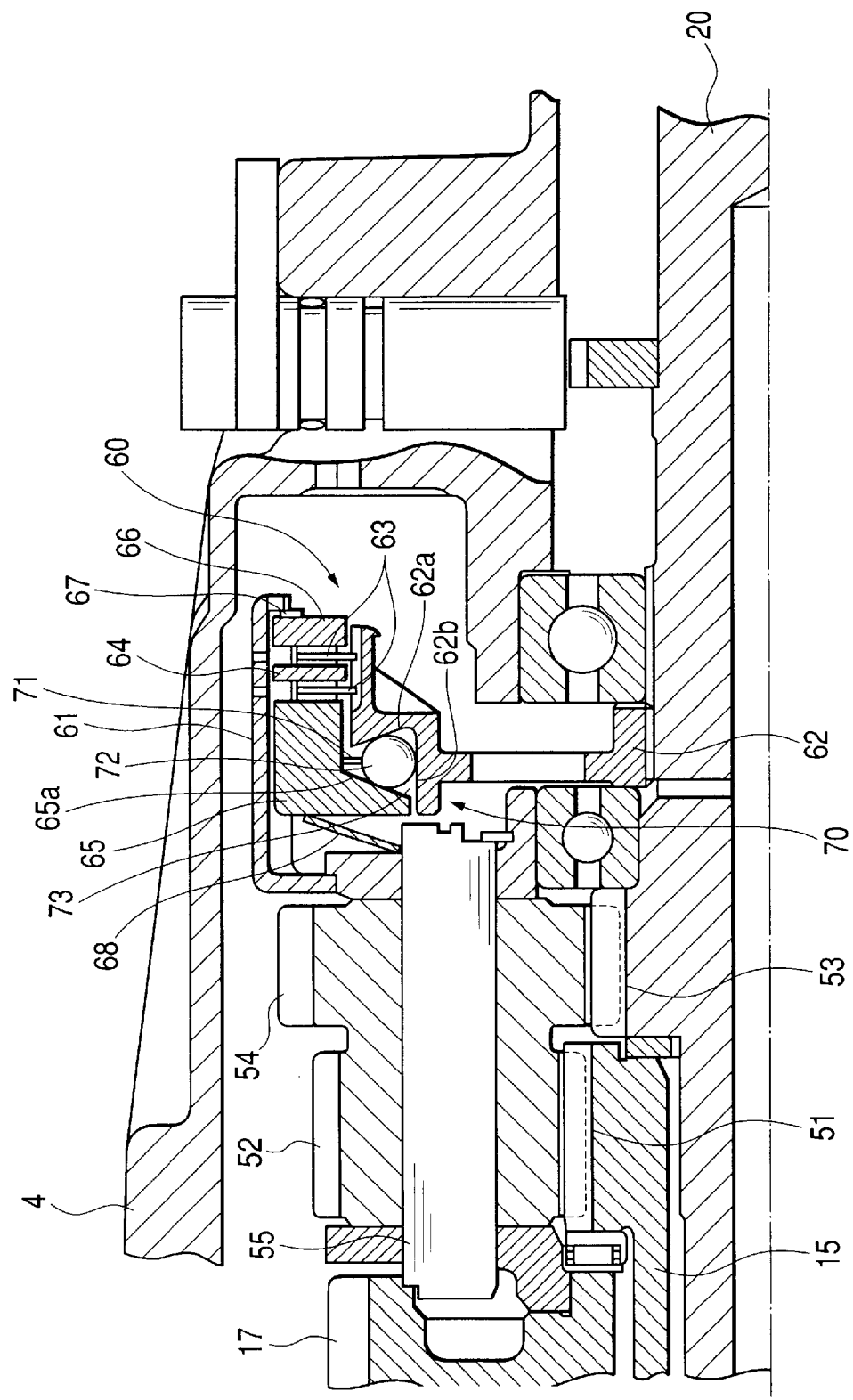
FIG. 2 shows a side sectional view of a center differential device.

Besides, the carrier 55 and the rear drive shaft 20 are coupled with each other through a pressure type differential limiting clutch 60. As shown in FIG. 2, a clutch drum 61 of the pressure type differential limiting clutch 60 is coupled to the carrier 55, and to this inner periphery, an outer periphery of a clutch hub 62 rotated integrally with the rear drive shaft 20 is provided to be opposite. Further, a drive plate 63 and a driven plate 64 are alternately disposed therebetween. An outer peripheral surface of a pressure plate 65 is brought into contact with an outside surface of the drive plate 63 disposed at a front side outer end, and a retainer plate 66 is brought into contact with an outside surface of the drive plate 63 disposed at a rear side outer end.

The outer peripheries of the driven plate 64, the pressure plate 65, and the retainer plate 66 are engaged in spline grooves formed on the inner periphery of the clutch drum 61 so as to be supported movably in the axial direction. The outside surface of the retainer plate 66 is prevented from falling out by a snap ring 67. Besides, the inner periphery of the drive plate 63 is engaged in a spline groove formed in the outer periphery of the clutch hub 62 and is supported movably in the axial direction.

Further, a cone disk spring 68 is provided at the back surface of the pressure plate 65, and the pressure plate 65 is pressed and energized in the direction toward the retainer plate 66 by energizing force of the cone disk spring 68. A friction torque (initial torque) is generated between the drive plate 63 and the driven plate 64 by the pressure plate 65 moved by receiving the energizing force of the cone disk spring 68, and this initial torque becomes a differential limiting torque when the center differential device 50 enters into differential rotation.

Incidentally, as a place at which the differential limiting torque is generated, there are conceivable three examples as follows.

(1) a place between the input side and one of output sides (e.g., a place between the automatic transmission output shaft 15 and a front drive shaft 16);

(2) a place between the input side and the other of output sides (e.g., a place between the automatic transmission output shaft 15 and a rear drive shaft 20); and (3) a place between the output sides (e.g., a place between the front drive shaft 16 and a rear drive shaft 20).

When it is generated between both the output sides as in this embodiment, it is the most effective, because torque transfer can be directly made from the one of output sides to the other of the output sides.

Besides, a torque limiter device 70 with a vehicle speed sensor is provided in the center differential device 50. The torque limiter device 70 cancels the initial torque of the pressure type differential limiting clutch 60 when a vehicle speed exceeds a predetermined speed. As shown in FIG. 2, a front cam surface 65a and a rear cam surface 62a as press surfaces opposed each other in a thrust direction are formed on the inner periphery of the pressure plate 65 and the outer periphery of the clutch hub 62. Further, a base surface 62b continuous with the rear cam surface 62a is formed on the clutch hub 62.

A ring-shaped space portion 73 having a triangular-cross-section converging in a radius direction with an inclined angle of angle θ (see FIG. 4) is formed by both the cam surfaces 62a and 65a and the base surface 62b. Further, a position plate 71 is disposed in a spaced portion 73. Since the inner periphery of the position plate 71 is spline-engaged with the base surface 62b, it is rotated integrally with the clutch hub 62.

However, as a modified example, the outer periphery of the position plate 71 may be spline-engaged with the pressure plate 65 so that it is rotated integrally with the pressure plate 65.

Figure 3:
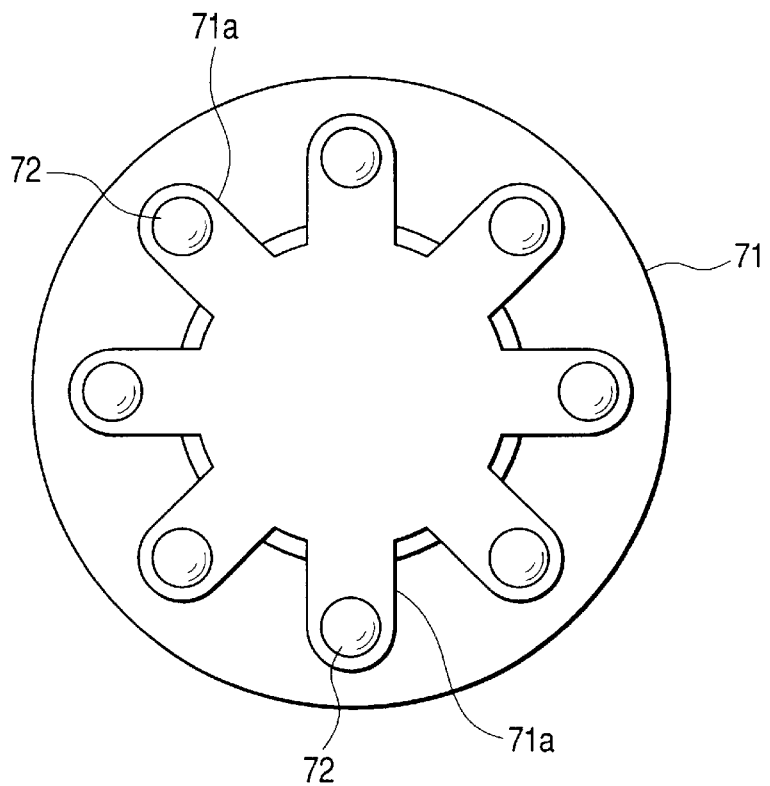
FIG. 3 shows a front view of a position plate.

Besides, as shown in FIG. 3, a plurality of pockets 71a are radially formed in the position plate 71, and a weight 72 formed into a ball shape is movably supported in each of the pockets 71a. This weight 72 is provided in the spaced portion 73 in the state where its movement in the circumferential direction is restricted by the pocket 71a and its movement in the radius direction is allowed. When the clutch hub 62 is stopped, it is in a free state. When centrifugal force is given by the rotation of the clutch hub 62, it is moved in the radius direction, and then both side surfaces of the weight 72 press the respective cam surfaces 65a and 62a.

Next, the operation of the embodiment according to the above structure will be described. First, the driving force of the engine 10 is inputted to the transmission input shaft 14 of the automatic transmission 30 through the torque converter 13, and speed-changed driving force changed to a predetermined speed by the automatic transmission 30 is inputted from the transmission output shaft 15 to the first sun gear 51 of the center differential device 50.

The torque outputted from the transmission output shaft 15 is distributed to the rear drive shaft 20 and the front drive shaft 16 through the center differential device 50, because of that:

(i) the first pinion 52 engaging with the first sun gear 51 and the second pinion 54 engaging with the second sun gear 53 that is provided at the rear drive shaft 20 are integrally formed, and (ii) the reduction gear 18 provided at the front drive shaft 16 is engaged with the reduction gear 17 provided at the carrier 55 supporting the pinions 52 and 54.

The torque distributed to the rear drive shaft 20 is further transmitted through the propeller shaft 21 and the rear differential device 22 to the rear wheel output shaft (not shown) connecting to the rear wheels. On the other hand, the torque distributed to the front drive shaft 16 is further transmitted through the front differential device 19 to the front wheel output shaft (not shown) of the front wheel. Accordingly, four-wheel drive running can be achieved.

The initial torque, set by the pressure force of the cone disk spring 68, of the pressure type differential limiting clutch 60 acts as the differential limiting torque, in a case of at least one of following situations:

(i) when departing from a rough road,
(ii) at running on a low $\mu$ road (i.e, a road having a low friction coefficient), or
(iii) at a state where one wheel is floating,
(iv) at a time when differential rotation between the front and rear transmission shafts occurs,
(v) during the occurrence of the differential rotation.

The reference torque distribution of the center differential device 50 of the embodiment is set so that much torque is distributed to the rear wheel. When the rear wheel slips before the front wheel, a small amount of the torque outputted to the rear drive shaft 20 at that time is transmitted to the front drive shaft 16 through the pressure type differential limiting clutch 60, and the torque of the rear wheel is reduced by this, and the occurrence of slip disappears.

At that time, in the pressure type differential limiting clutch 60, the cone disk spring 68 presses the drive plate 63 and the driven plate 64 provided between the pressure plate 65 and the retainer plate 66, and the friction force (initial force) acts as the differential limiting torque.

On the other hand, at high speed running, the torque limiter device 70 is activated, and the initial torque of the pressure type differential limiting clutch 60 is cancelled. That is, at the high speed running, the weight 72 supported by the pocket 71a formed in the position plate 71 rotated integrally with the rear drive shaft 20 receives centrifugal force and is moved in the radius direction, intrudes between the cam surfaces 65a and 62a, and presses both the cam surfaces 65a and 62a.

When the pressure force of the weight 72 to the respective cam surfaces 65a and 62a exceeds the pressure force of the cone disk spring 68, the weight 72 pushes and extends an interval between the cam surfaces 65a and 62a, the pressure plate 65 forming the cam surface 65a moves back against the press force of the cone disk spring 68, the pressure between the drive plate 63 and the driven plate 64 is relieved, and the initial torque is cancelled.

Like this, in a high speed region in which the differential limiting torque is not needed, the initial torque of the torque limiter device 70 which performs a differential limiting torque is actively cancelled, so that running stability is improved, and torque loss is reduced, and consequently, fuel efficiency can be improved.

Figure 4:
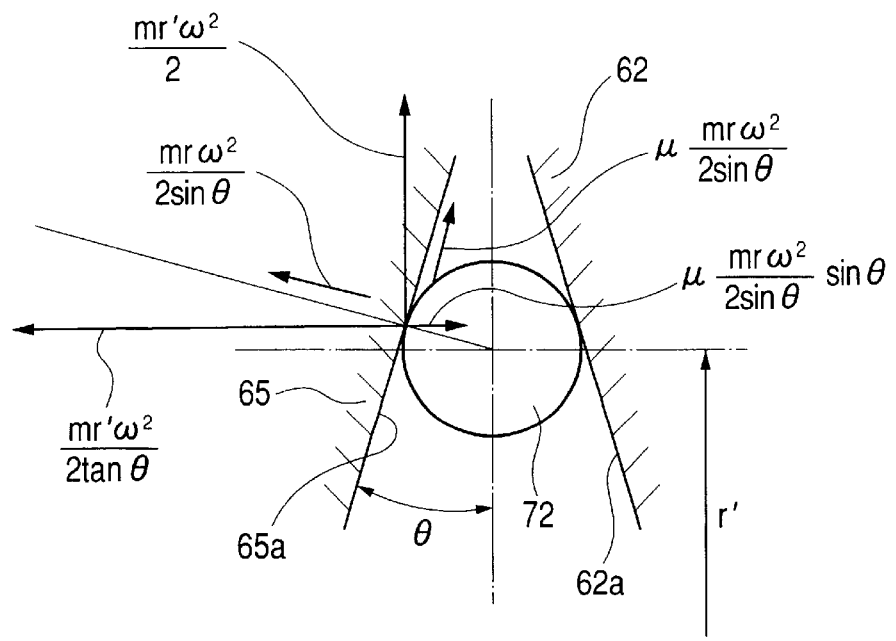
FIG. 4 is an explanatory view showing a vector by a centrifugal force generated between a weight and a cam surface.

Incidentally, as shown in FIG. 4, a thrust force F acting on the cam surfaces 65a and 62a by the centrifugal force through the weight 72 can be obtained from the following expression.

$$F = \{(1/\tan\theta) - \mu\} m \cdot n \cdot r' (2\pi/60)^2 N^2$$

Here, $\theta$ is a taper angle of the cam surface, $\mu$ is a friction coefficient, m is mass of the weight, n is the number of the weights, and r' is a designated radius.

When the thrust force F exceeds the thrust force acting on the cam surface 65 by the energizing force of the cone disk spring 68, the pressure plate 65 moves back, and the differential limiting torque is cancelled. Incidentally, the above formula can be rewritten from FIG. 4 and from the formula: $\omega = (2\pi/60)N$. Incidentally, the symbol r in FIG. 4 designates an arbitrary radius.

Accordingly, it becomes possible to cancel the differential limiting torque in a desired speed region by suitably setting the mass m of the weight 72, the number n, the designated radius r', and the taper angle $\theta$ of the cam surface 65a.

Like this, according to the embodiment, at a predetermined vehicle speed or higher at which the differential limiting torque becomes unnecessary, the initial torque of torque limiter device 70 is actively cancelled, so that the running stability is improved, and the fuel efficiency is improved by the reduction of torque loss.

Further, since a hydraulic pressure source is not needed, it can be relatively easily attached to a driving force distribution device which is not originally provided with a hydraulic pressure source, such as a torque coupling, and is excellently adding flexible controllability.

In addition, the strength of the driving system can be lowered by reducing the torque loss, and as a result, the weight becomes light, and the fuel efficiency can be further improved therethrough. Incidentally, the present invention is not limited to the foregoing embodiment, but for example, the torque limiter device 70 may be provided between differential motion generating mechanism portions of a torque coupling. Besides, one of the cam surfaces 62a and 65a may be formed to vertically extend in a circumferential direction. Further, for example, the weight 72 is not limited to the ball shape, but as long as it is moved in the circumferential direction by centrifugal force and presses the cam surface, for example, a roller-shaped one may be adopted.

While there has been described in connection with the preferred embodiment of the invention, various changes and modifications may be made therein without departing from the invention, and it is aimed, therefore, to cover in the appended claim all such changes and modifications as fall within the true spirit and scope of the invention.

As described above, according to the present invention, since the differential limiting torque is cancelled by using the centrifugal force, the hydraulic pressure source is not needed. Therefore, it can be relatively easily attached to the driving force distribution device which is not provided with a hydraulic pressure source, and is excellently performs a flexible controllability.

Besides, in a region where the differential limiting torque is not needed, the differential limiting torque is actively cancelled, so that the torque loss is reduced, and running stability is improved, and further, the fuel efficiency can be improved.

What is claimed is:

1. A driving force distributing apparatus, comprising:
    a differential device provided in a vehicle for torque distribution;
    a differential limiting clutch provided to variably apply a differential limiting torque to limit a differential operation of said differential device;
    an initial torque applying mechanism provided to apply an initial torque to said differential limiting clutch; and
    a torque limiter provided to cancel said initial torque at a predetermined vehicle speed.

2. The apparatus of claim 1, wherein said torque limiter is provided between a front wheel shaft and a rear wheel shaft.

3. The apparatus of claim 1, wherein said torque limiter is provided between an output shaft and a front wheel shaft.

4. The apparatus of claim 1, wherein said torque limiter is provided between an output shaft and a rear wheel shaft.

5. The apparatus of claim 1, wherein said differential limiting clutch comprises:
    a clutch drum operatively connected to one of an output shaft, a front drive shaft, and a rear drive shaft;
    a clutch hub operatively connected to the another one of said output shaft, said front drive shaft and said rear drive shaft;

a plurality of plates interposed between said clutch drum and said clutch hub; and a pressure plate operative to press said plurality of plates to engage said clutch drum and said clutch hub.

6. The apparatus of claim 5, wherein said torque limiter comprises a plurality of weights interposed in a space defined between cam surfaces formed on said clutch hub and said pressure plate, said plurality of weights being movable in a radial direction depending upon vehicle speed to push against said pressure plate.

7. The apparatus of claim 6, wherein said torque limiter further comprises a position plate disposed in said space and having a plurality of pockets formed in a radial direction for supporting movement of corresponding weights.

8. The apparatus of claim 1, wherein said initial torque applying mechanism comprises a spring mechanism.

9. The apparatus of claim 8, wherein said torque limiter is adapted to apply a force opposite to said spring mechanism to thereby cancel said initial torque.

10. The apparatus of claim 8, wherein said spring mechanism comprises a cone disk spring.

11. A driving force distributing apparatus for a four-wheel drive vehicle, comprising:

a center differential device provided distribute a torque from an output shaft of a transmission to a front drive shaft operatively connected to front wheels and a rear drive shaft operatively connected to rear wheels;

a differential limiting clutch provided to variably apply a differential limiting torque to limit a differential operation of said center differential device;

an initial torque applying mechanism provided to apply an initial torque to said differential limiting clutch; and a torque limiter provided to cancel said initial torque at a predetermined vehicle speed.

12. The driving force distributing apparatus according to claim 11, wherein said torque limiter is provided between said front drive shaft and said rear drive shaft.

13. The driving force distributing apparatus according to claim 11, wherein said torque limiter is provided between said output shaft and said front drive shaft.

14. The driving force distributing apparatus according to claim 11, wherein said torque limiter is provided between said output shaft and said rear drive shaft.

15. The apparatus of claim 11, wherein said differential limiting clutch comprises:

a clutch drum operatively connected to one of an output shaft, a front drive shaft, and a rear drive shaft;

a clutch hub operatively connected to the another one of said output shaft, said front drive shaft and said rear drive shaft;

a plurality of plates interposed between said clutch drum and said clutch hub; and a pressure plate operative to press said plurality of plates to engage said clutch drum and said clutch hub, and wherein said torque limiter comprises:

a plurality of weights interposed in a space defined between cam surfaces formed on said clutch hub and said pressure plate, said plurality of weights being movable in a radial direction depending upon vehicle speed to push against said pressure plate; and a position plate disposed in said space and having a plurality of pockets formed in a radial direction for supporting movement of corresponding weights.

16. The apparatus of claim 15, wherein said initial torque applying mechanism comprises a cone disk spring, wherein said torque limiter is adapted to apply a force opposite to said spring mechanism to thereby cancel said initial torque.

17. A driving force distributing apparatus for a four-wheel drive vehicle, comprising:

a center differential device provided to distribute a torque from an output shaft of a transmission to a front drive shaft operatively connected to front wheels and a rear drive shaft operatively connected to rear wheels;

a differential limiting clutch provided to variably apply a differential limiting torque to limit a differential operation of said center differential device, said differential limiting clutch having a clutch drum operatively connected to one of said output shaft, said front drive shaft and said rear drive shaft, a clutch hub operatively connected to the other one of said output shaft, said front drive shaft and said rear drive shaft, a plurality of plates interposed between said clutch drum and said clutch hub, and a pressure plate operative to press said plates to engage said clutch drum and said clutch hub;

a spring mechanism provided to apply a spring force to said pressure plate to preload said differential limiting, thereby to generate an initial torque; and a torque limiter provided to apply a force opposite to said spring force depending on vehicle speed, to thereby cancel said initial torque at a predetermined vehicle speed.

18. The driving force distributing apparatus according to claim 17, wherein said spring mechanism comprises a cone disk spring.

19. The driving force distributing apparatus according to claim 17, wherein said torque limiter comprises a plurality of weights interposed in a space having a triangular-cross-section defined between cam surfaces formed on said clutch hub and said pressure plate, respectively, whereby said weights move in a radius direction depending on vehicle speed and push back said pressure plate against said spring force according to said cam surfaces.

20. The driving force distributing apparatus according to claim 19, wherein said torque limiter further comprises a position plate disposed in said space and having a plurality of pockets formed in a radial direction for supporting movement of corresponding weights.

* * * * *